US008739338B2

(12) United States Patent
Rickman et al.

(10) Patent No.: US 8,739,338 B2
(45) Date of Patent: Jun. 3, 2014

(54) INFLATABLE CUSHION VALVE AND ATTACHMENT APPARATUS

(75) Inventors: Paul A. Rickman, Belleville, IL (US); Dennis L. Clapper, Swansea, IL (US)

(73) Assignee: Roho, Inc., Belleville, IL (US)

( * ) Notice: Subject to any disclaimer, the term of this patent is extended or adjusted under 35 U.S.C. 154(b) by 452 days.

(21) Appl. No.: 13/062,844

(22) PCT Filed: Sep. 2, 2009

(86) PCT No.: PCT/US2009/055709
§ 371 (c)(1),
(2), (4) Date: Apr. 25, 2011

(87) PCT Pub. No.: WO2010/028029
PCT Pub. Date: Mar. 11, 2010

(65) Prior Publication Data
US 2011/0258783 A1    Oct. 27, 2011

Related U.S. Application Data

(60) Provisional application No. 61/095,113, filed on Sep. 8, 2008, provisional application No. 61/144,337, filed on Jan. 13, 2009.

(51) Int. Cl.
| A47C 27/10 | (2006.01) |
| A47C 27/08 | (2006.01) |
| F16K 5/08 | (2006.01) |
| F16K 11/065 | (2006.01) |
| F16K 11/07 | (2006.01) |

(52) U.S. Cl.
CPC .............. *A47C 27/10* (2013.01); *A47C 27/081* (2013.01); *F16K 5/08* (2013.01); *F16K 11/07* (2013.01); *F16K 11/0716* (2013.01)
USPC ......... 5/710; 5/713; 137/625.17; 137/625.46; 137/625.48; 251/304; 251/319

(58) Field of Classification Search
CPC .... A47C 27/083; A47C 27/081; A47C 27/10; A61G 7/05769; A61G 7/05776; F16K 11/044; F16K 11/07; F16K 11/0716; F16K 11/048; F16K 1/00; F16K 1/32; F16K 1/36; F16K 5/08; F16K 25/005
USPC .................. 5/710, 713, 706, 655.3, 654, 644; 137/625.48, 625.15, 625.17, 625.21, 137/625.25, 625.46; 251/304, 315.1, 318, 251/319, 324, 325
See application file for complete search history.

(56) References Cited

U.S. PATENT DOCUMENTS 4,197,837 A * 4/1980 Tringali et al. ............... 601/150
4,541,136 A   9/1985 Graebe
(Continued)

FOREIGN PATENT DOCUMENTS

| JP | 2004113309 A | 4/2004 |
| KR | 200175359 Y1 | 3/2000 |
| KR | 100787580 B1 | 12/2007 |

OTHER PUBLICATIONS

International Search Report and Written Opinion of International Application No. PCT/US2009/055709 dated Mar. 16, 2010.

*Primary Examiner* — Robert G Santos
(74) *Attorney, Agent, or Firm* — Polster Lieder

(57) ABSTRACT

An attachment apparatus (20) for attachment to the air conduits (6,8,10,12) of a zoned air cell cushion A or mattress to an associated valve. The attachment apparatus comprises a connector assembly (24) with connectors (26, 28, 30, 32) secured in the ends (N1, N2, N3, N4) of air conduits secured in a conduit constraint (38). Each air conduit is in fluid communication with a separate inflation zone (r,s,t,u) of the cushion or mattress. The connectors are in fluid cooperation with a valve (60) that places normally isolated zones into fluid communication and vice versa. The connector assembly may function as a base for any one of a number of valves (60, 103, 150, 200, 400, 500).

11 Claims, 11 Drawing Sheets

(56) References Cited

U.S. PATENT DOCUMENTS

| | | |
|---|---|---|
| 6,550,086 B2 | 4/2003 | Boyd |
| 6,564,410 B2 * | 5/2003 | Graebe et al. ............. 5/710 |
| 6,687,936 B2 * | 2/2004 | Graebe et al. ............. 5/710 |
| 8,156,589 B2 * | 4/2012 | Liu et al. ............. 5/713 |
| 2002/0066143 A1 * | 6/2002 | Graebe et al. ............. 5/710 |
| 2003/0192125 A1 * | 10/2003 | Graebe et al. ............. 5/710 |
| 2004/0237201 A1 | 12/2004 | Fraser et al. |
| 2011/0061169 A1 * | 3/2011 | Liu et al. ............. 5/710 |
| 2011/0258783 A1 * | 10/2011 | Rickman et al. ............. 5/710 |

* cited by examiner

INFLATABLE CUSHION VALVE AND ATTACHMENT APPARATUS

CROSS REFERENCE TO RELATED APPLICATIONS

The present application is the United States National Stage under 35 U.S.C. §371 of International Application Serial No. PCT/US2009/055709, having an International Filing Date of Sep. 2, 2009 and is related to, and claims priority from, U.S. Provisional Patent Application Ser. No. 61/095,113 filed Sep. 8, 2008 and U.S. Provisional Patent Application Ser. No. 61/144,337 filed Jan. 13, 2009, which are incorporated by reference.

BACKGROUND OF THE INVENTION

The invention relates generally to inflatable mattresses and cushions used for comfort and the prevention and treatment of pressures sores and, more particularly, an apparatus for attaching a valve to an inflatable cushion and attachable valves.

More particularly the disclosure relates to an improved apparatus for mounting a valve as well as the valves for use with an inflatable mattress or cushion having normally isolated zones to place the normally isolated zones in communication with each other or with the atmosphere in any desired arrangement of communication. The valve has improved attachment and sealing features.

Those individuals who are confined to wheelchairs run the risk of tissue breakdown and the development of pressure sores, which are extremely dangerous and difficult to treat and cure. Typically, much of the individual's weight concentrates in the region of the ischia, that is, at the bony prominence of the buttocks, and unless frequent movement occurs, the flow of blood to the skin tissue in these regions decreases to the point that the tissue breaks down. Cushions that are especially designed for wheelchairs exist for reducing the concentration of weight in the region of the ischia, and these cushions generally seek to distribute the user's weight more uniformly over a larger area of the buttocks.

Cellular cushions provide the most uniform distribution of weight and thus provide the greatest protection from the occurrence of pressure sores. These cushions have an array of closely spaced air cells that project upwardly from a common base. Within the base the air cells communicate with each other, and thus, all exist at the same internal pressure. Hence, each air cell exerts essentially the same restoring force against the buttocks, irrespective of the extent to which it is deflected. U.S. Pat. No. 4,541,136, which is incorporated herein by reference, shows a cellular cushion currently for use on wheelchairs.

In a sense the typical cellular cushion provides a highly displaceable surface that tends to float the user. While this reduces the incidence of pressure sores, it detracts from the stability one usually associates with a seating surface. Most of those confined to wheelchairs have little trouble adjusting to the decrease in stability, but for those who have skeletal deformities, particularly in the region of the pelvis and thighs, and for those who lack adequate strength in their muscles, lesser stability can be a source of anxiety. A variation of the cellular cushion addresses this problem with totally isolated zones and also with cells of varying height. By varying the volume of air between zones, for example, one can accommodate for skeletal deformities while still maintaining satisfactory protection against pressure sores. U.S. Pat. No. 4,698,864, which is incorporated herein by reference and owned by the assignee of the instant invention, shows zoned cellular cushion with cells of varying height.

Typically, a zoned cellular cushion has a separate filling stem and valve for each of its zones. The user simply opens the valve of each stem and introduces air into the zone for the stem, usually with a hand pump, and then releases the air from the zones until the desired posture is achieved. In a more sophisticated arrangement, a hose kit connects a single pump to a manifold, which in turn is connected to the several valves through separate hoses. Those hoses are fitted with separate hose clamps so that the air from the pump may be directed to the cells of the individual zones independently. Likewise, the air can be released from them independently, all by manipulating the clamps.

The hoses of the hose kit lie externally of the cushion and may become entangled in the components of a wheelchair. Furthermore, by reason of their remote locations, the hose clamps are difficult to manipulate. Examples of zoned inflatable cushions that demonstrate significant advantages from zoning are provided in U.S. Pat. No. 5,163,196 and U.S. Pat. No. 5,502,855, both of which are incorporated herein by reference.

In general, in a zoned cushion, the valve is open to allow communication between the zones and cushion is properly inflated or over inflated and the air flows to all the zones to reach a state of equilibrium. The cushion is placed on a proper support surface and the user is seated on the cushion and optimally positioned. Air is slowly let out of the cushion until the buttocks of the seated user sink deeper into the array of cells until the cells tend to envelope and assume the contour of the buttock. For example, enough air is released to bring the Ischia to within about ½ inch from the bottom of the cushion. All cells remain at essentially same internal pressure. When the user reaches optimal immersion, the user moves or is moved to a posture desired to be maintained for an extended period of time. This can cause a redistribution of air among the inflation zones until they reach a desired equilibrium for that particular user. The pressure in each zone is optimally achieved and the valve is closed to maintain the optimal pressure or restoring force in each zone.

The present invention is an improvement on valves required by zoned cellular cushions. Heretofore, the zoned cushions employed integral channels or conduits which lead from the several zones and which are connected through an integral common manifold and associated valve. One such valve comprises a flap that is folded over to seal off the ends of the channels or opened to allow communication between the zones through a manifold contained within the flap. Through use it has been determined that these flap-type valves and other prior art zoned cushion valves suffer from some drawbacks. First, in the flap-type valve, the flap has to be manually folded closed and secured with a snap or the like. Often these types of apparatus are difficult for a disabled individual to manipulate. The flap can be awkwardly positioned under the cushion.

Newer valves designed to prevent leakage are the subject matter of U.S. Pat. Nos. 6,687,936 and 6,564,419, both of which are incorporated herein by reference. Although these newer valves work well for their intended purposes and represent an improvement over previous designs, the inventors have developed novel valve designs that employ fewer parts, are more economical and simple to assemble and incorporate an improved apparatus for attachment of a valve to the cushion. Furthermore, the new valve designs are easier to operate by a person having limited hand function. The valves operate with less force than prior art valves.

SUMMARY OF THE INVENTION

Valves for use with an inflatable mattress or cushion having normally isolated zones to place the normally isolated zones in communication with each other or with the atmosphere in any desired arrangement of communication and an improved attachment apparatus for attaching valve to zoned mattresses or cushions.

DETAILED DESCRIPTION

Figure 1:
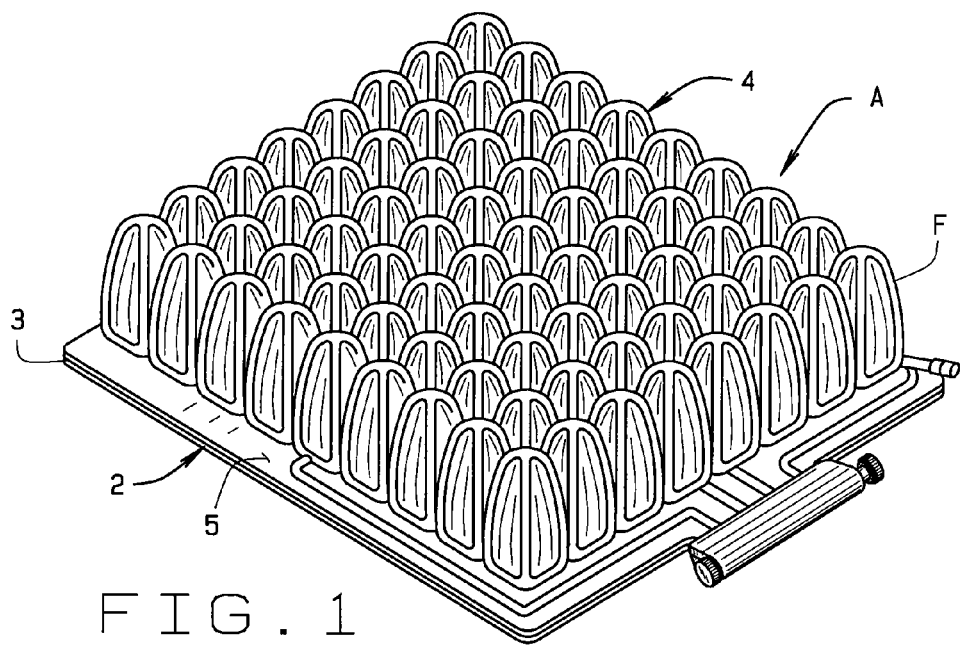
FIG. 1 is a top perspective view of a cushion employing a prior art valve.
Figure 2:
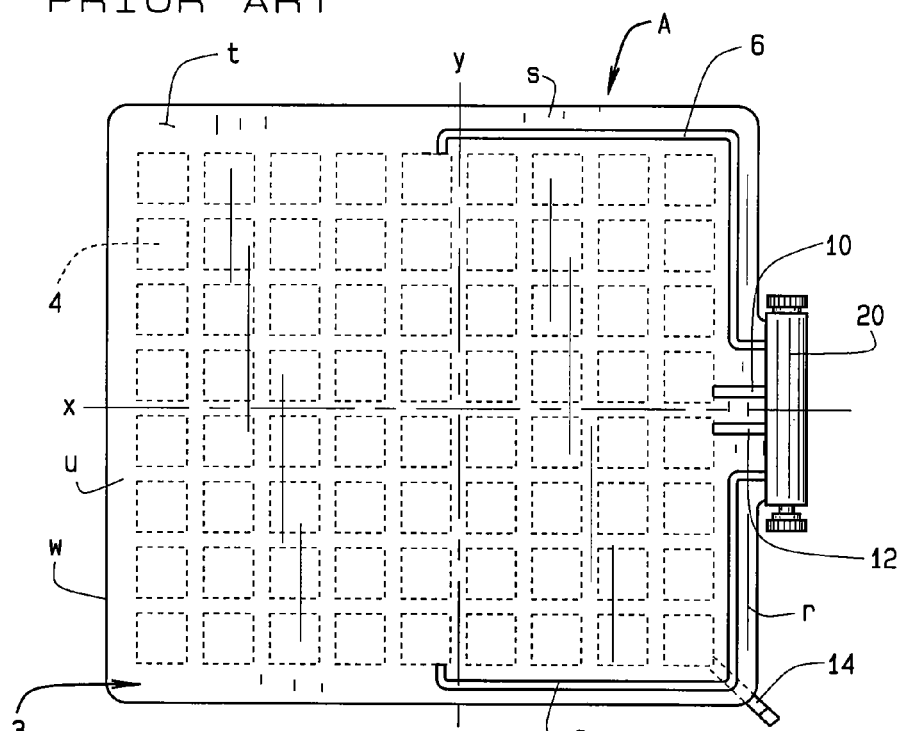
FIG. 2 is a bottom plan view of a cushion and valve.

Referring now to the drawings (FIGS. 1 and 2), the letter A designates one exemplary embodiment of a cellular cushion which is highly flexible and is designed for use on an underlying supporting surface, such as the seat of a wheelchair, the seat of a vehicle or the seat of a conventional chair. Being cellular, cushion A distributes the weight of its occupant generally uniformly over the entire area of the buttocks and thereby dissipates the pressures resulting from the supported weight of the ischia, that is, the bony prominence of the buttocks. It further has the capacity to position and stabilize the user. It will be appreciated that although the present invention is described as employed on a cushion, the novel valve assembly can also be employed with an air mattress or air mattress section or other similar devices that include inflatable zones.

The cushion A includes a base 2 and air cells 4 that project upwardly from the base 2. Generally the air cells 4 are molded with a web 5 interconnecting the cells 4. The cells 4 and interconnecting web are sometimes referred to as a conformal. The base is comprised of the web 5 and a backing 3. Both the backing 3 and conformal can be molded or otherwise formed from a highly flexible neoprene. The cells 4 and web 5 may be formed over a mandrel in a dipping operation as described in U.S. Pat. No. 4,541,136. On the other hand, the conformal can be molded from a highly flexible neoprene and the base 2 can be formed from a polyurethane or both components can be vacuum formed of formed from polyurethane.

The base 2 generally is rectangular and the cells 4 are arranged on it in longitudinal and transverse rows, with each cell occupying both a longitudinal and a transverse row. It will be appreciated that although the illustrated embodiment provides for individual cells each having a configuration consisting of four fins F, the configuration of the individual cells is incidental to the invention. The present invention can be used with a cushion employing any preferred configuration of cells 4 that is, for example, cells having any number of fins or sides, cells having no fins, for example, cylindrical, cubical cells or rounded cells.

The cells 4 are further arranged in zones, typically four zones r, s, t and u. The zones r and s lie side by side at the front of the cushion A and the zones t and u exist side by side at the rear of the cushion A. The right zones r and u are separated from the left zones s and t along a longitudinal axis x, whereas the front zones r and s are separated from the rear zones t and u along a transverse axis y. More or fewer zones and differing arrangements of those zones may be employed.

Within the base 2 the cells 4 of the zone r communicate with each other, so that all exist at the same general internal pressure irrespective of how far any individual cell is depressed. The same holds true with regard to the cells 4 of the zone s, the cells 4 of the zone t, and the cells 4 of the zone u. In other words, the cells 4 of zone r are normally isolated from the cells of the remaining zones s, t and u. Likewise, the cells 4 of the zone s are normally isolated as are the cells 4 of zones r, t and u and so forth. Thus, the cells 4 of each zone r, s, t and u collectively define a separate inflation zone or compartment.

Figure 19:
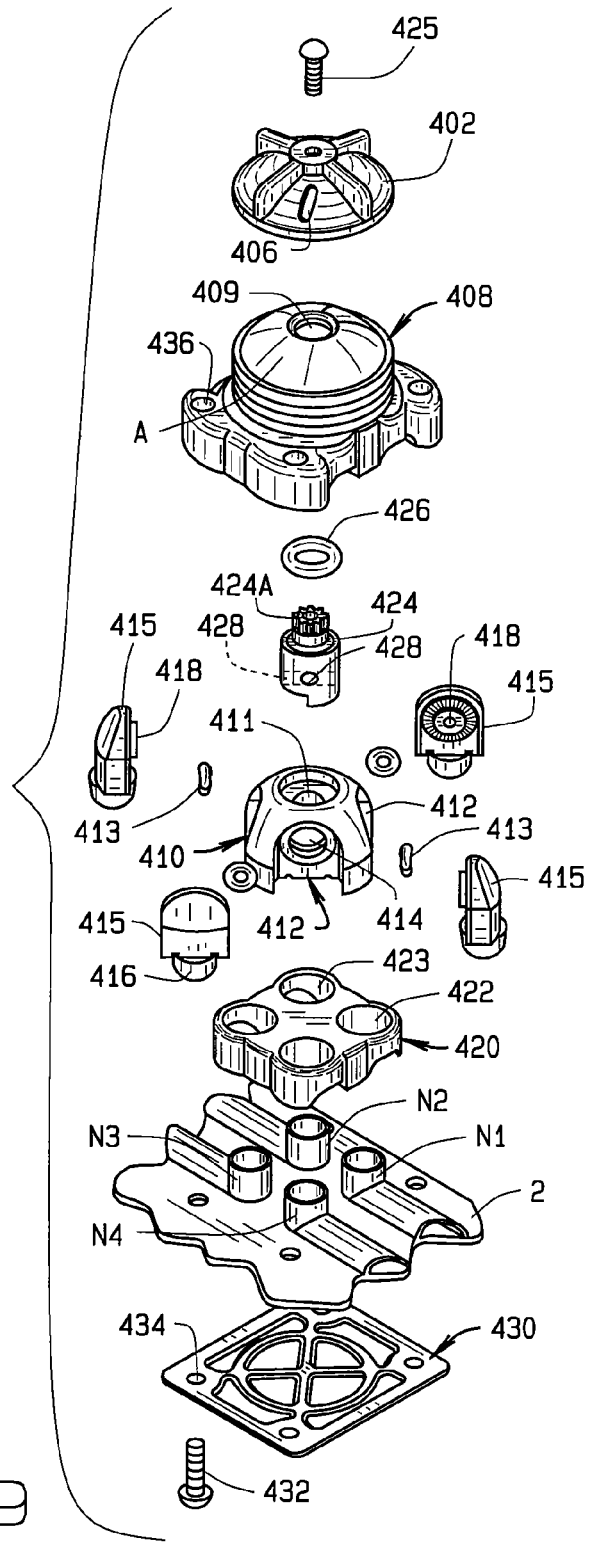
FIG. 19 is an exploded view thereof.

A fluid conduit 6 extends from zone t toward the one side, for example the front edge of the cushion. Likewise a fluid conduit 8 extends from zone u to the front of the cushion. In the illustrated embodiment the two shorter conduits 10 and 12 extend from zones s and r respectively toward the front of the cushion. The conduits 6, 8, 10 and 12 all terminate adjacent an edge of the cushion. However, the conduits 6, 8, 10 and 12 could terminate at another location on the cushion base. For example, the conduits could terminate in area normally occupied by a cell, such as a front row cell, and have a rectangular arrangement as shown in FIG. 19, for example.

Figure 2A:
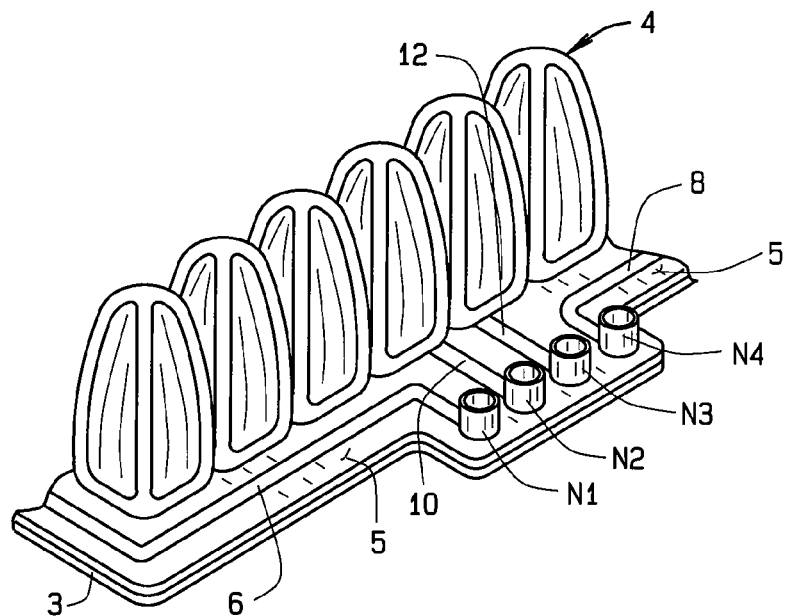
FIG. 2A is a partial perspective view of a cushion sans valve illustrating the fluid conduits terminating in open ended nipples.

As shown in FIG. 2A, the conduits terminate in flexible, resilient, upstanding, upon-ended nipples N1-N4 for the attachment of a novel valve mounting apparatus as will be explained below. It will be appreciated that the various conduits and nipples can be formed in any appropriate manner without departing from the scope of the invention. For example, the conduits and nipples can be formed integrally in the base 2, for example as elements of conformal or web 5, when the base is molded or vacuum formed or could be separate elements of the cushion that lead from an inflation zone toward an edge of the cushion. Moreover, the nipples do not have to be linearly aligned as illustrated in FIGS. 2A and 3, but could form other patterns of nipples, such as the nipples N-1-N4 comprising four corners of a rectangular arrangement of nipples or the like, as show in FIGS. 17, 19 and 21, for example.

Figure 3:
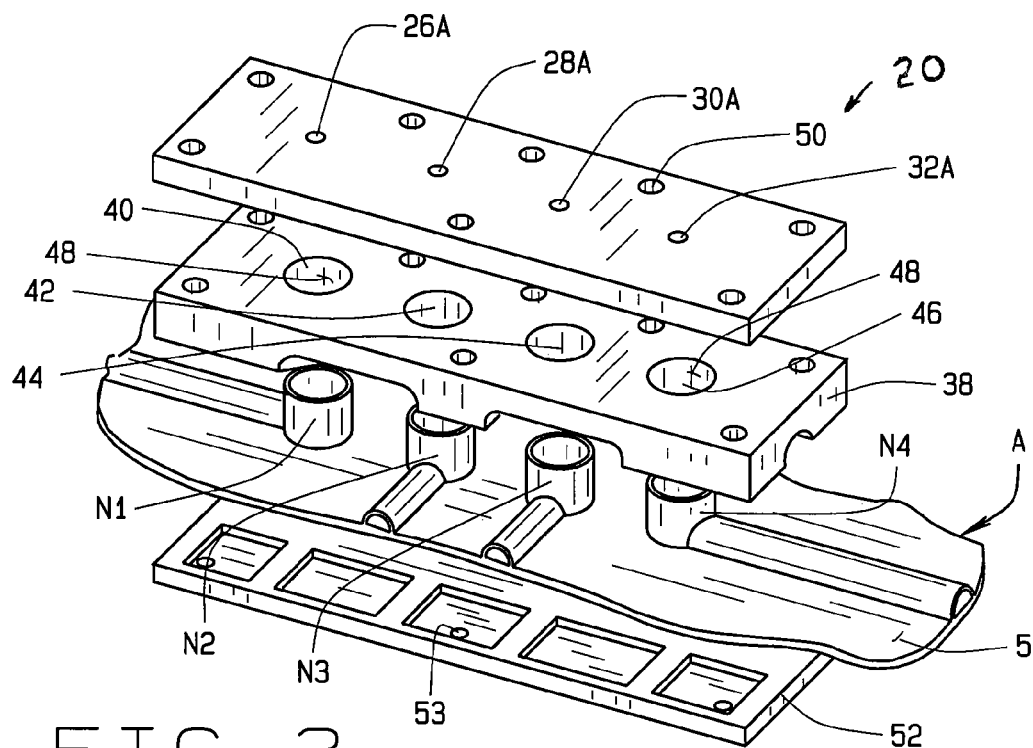
FIG. 3 is an exploded perspective view of an attachment apparatus for a valve of the present invention.
Figure 4A:
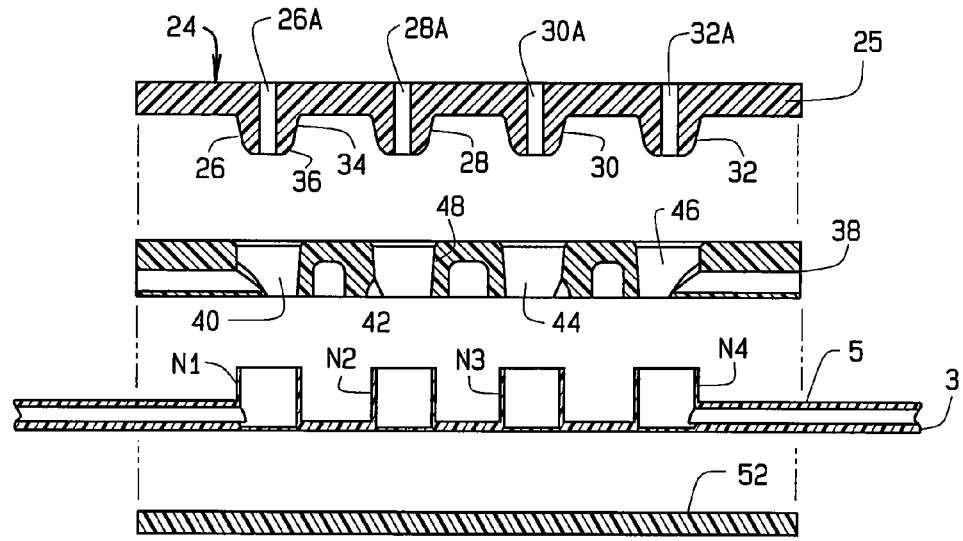
FIG. 4A is an exploded view thereof with a cushion base in position for attachment.
Figure 4B:
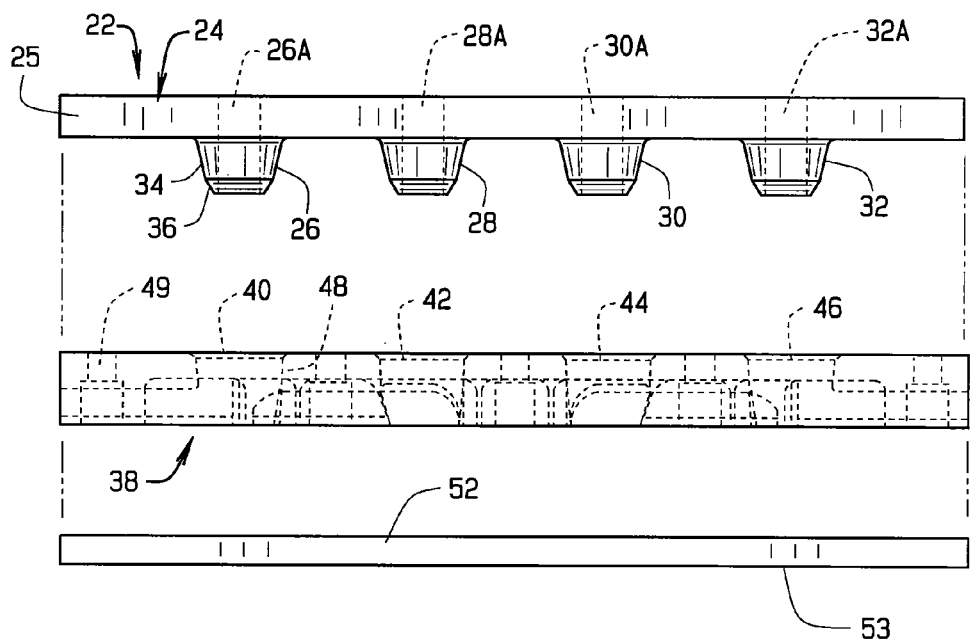
FIG. 4B is an exploded cross sectional view illustrating addition structure in the attachment apparatus.
Figure 5:
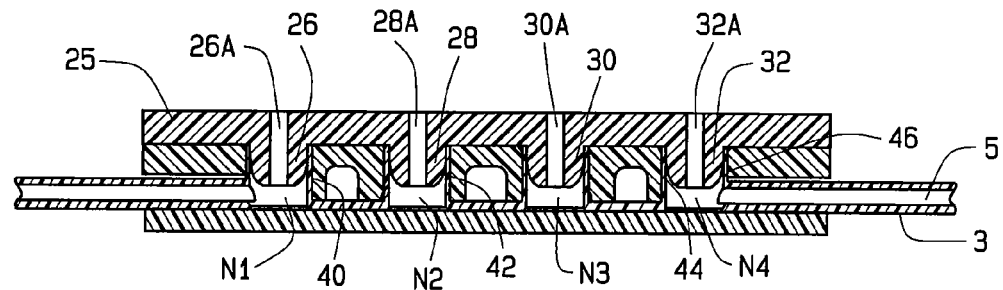
FIG. 5 is a cross-sectional view thereof with attached to the cushion.

FIGS. 3 through 5 illustrate one aspect of an attachment apparatus for attaching various of the valves of the present invention to an inflatable cellular cushion of the type described above or in similar cushions The attachment apparatus, referred to generally by reference numeral 20, includes, for the purposes of generality and clarity, a top 22. In these drawings, top 22 represents any valve structure that will be attached to the cushion as will be explained. It will be appreciated that in FIGS. 3 through 5, the top section 22 comprises a connector assembly 24. In some aspects of the invention, connector assembly 24 can be incorporated into a valve as a bottom wall or a section of a valve. In general, connector assembly 24 generally represents any apparatus or element or assembly of elements of a valve that provides connectors that can connect to conduits leading from the zones of a zoned cellular cushion to allow fluid communication with zones of a zoned cellular cushion through an associated valve, as will be explained further below.

In the illustrated aspect of the attachment apparatus 20, connector assembly 24 has a base 25 having a generally rectangular configuration. There are four depending connectors 26, 28, 30 and 32 aligned along the underside of the base 25. This embodiment is designed for use with a zoned cellular cushion having four normally isolated zones of cells. However, the general principles can be employed with a cushion or mattress having more or fewer than four zones by including more than four connectors or fewer connectors.

Although in the embodiment illustrated in FIGS. 3-5, the depending connectors are arranged in a linear pattern. It should be understood that the connector assembly may have alternative arrangements of depending connectors, such as an arrangement in a rectangular pattern or the like. In any event the connectors are generally cylindrical, or blunt conical shape with a tapered wall 34 and beveled tip 36. A connector that is not tapered or does not have a beveled tip is within the scope of the invention. Each connector includes an opened ended internal bore 26A, 28A, 30A and 32A that, in the embodiment of FIGS. 3-5 extend through base 25 and open out of the top of the base so as to be in fluid communication with appropriate elements of an associated valve as will be explained. Briefly, however, it will be understood at this point that the bores of connectors 26, 28, 30 and 32 will be in fluid communication with a separate inflation zone of an air cushion when mounted, for example through conduits 6, 8, 10 and 12.

Attachment apparatus 20 includes a middle section 38 that is, in the example, is substantially rectangular and complementary in shape to base 25. Middle section 38, which also can be referred to as a nipple frame or conduit constraint, includes four aligned vertical, open-ended bores 40, 42, 44 and 46. Each recited bore has a tapered inner wall 48 that can be complementary to tapered wall 34 of the connectors. Consequently, inner wall does not have to be tapered. When assembled and attached to a cushion, bores 40, 42, 44 and 46 are positioned over four aligned, upstanding open ended nipples N1 through N4 at the edge of the cushion. As stated above, each nipple is in fluid communication with one of the inflation zones through air conduits 6, 8, 10 and 12, for example, molded into the cushion base or conformal 5. When assembled, connectors 26, 28, 30 and 32 are inserted into the open ends of the nipples N1 through N4, respectively, and urged into bores 40, 42, 44 and 46 of the middle section until tightly seated, as best seen in FIG. 5. The nipples, which generally comprise neoprene or other similar material, function as a gasket to form an airtight seal between the connectors and the bores of middle section 38. Middle section 38 also may include a plurality of openings, such as 49 in FIG. 4B, that engage holes 50 in the base 25. Openings 49 can have an inner bore.

Although middle section 38 is shown with bores in a linear alignment, it will be appreciated that the bores could be configured differently, for example, in a four corner arrangement as shown in FIG. 19, so as to conform to a different pattern of connectors and conduit openings or nipples.

Apparatus 20 includes a bottom plate 52 that is position under the edge of the cushion and impinges the cushion base 2 between middle section 38 and the bottom plate. In the illustrated example, bottom plate 52 is generally rectangular in configuration and complementary in shape to the top and middle sections. Plate 52 can be connected to the middle section or directly to the top section (or a valve housing as will be explained below) by long screws or rivets introduced through holes 53 in the bottom plate, through the cushion base, openings 49 and engage holes 50 in the top section. In any event, it will be noted that apparatus 20 now is secured to the cushion with the connectors 26, 28, 30 and 32 of connector assembly 24 firmly secured in the ends of the conduit nipples through middle section 38, as explained. Hence, if conduit assembly 24, or analogous structures, were an element of a valve, the valve would be attached to a cushion without the use of glue to attach the connectors to the nipples and the tight, gasket like fit of the connectors in the nipple ends extending through middle section 38 prevents air leakage and impedes dislodgment of an associated valve from the cushion.

Figure 6:
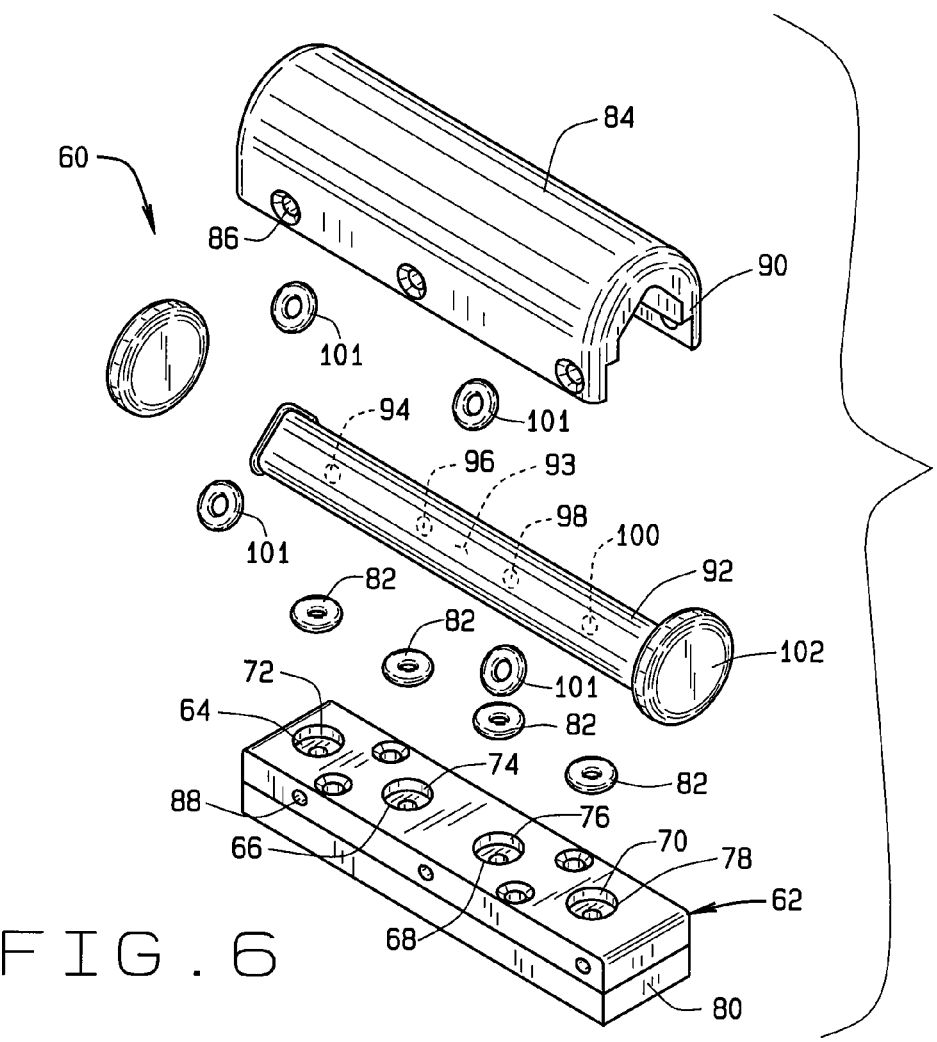
FIG. 6 is an exploded view of one aspect of a valve of the present invention.
Figure 7:
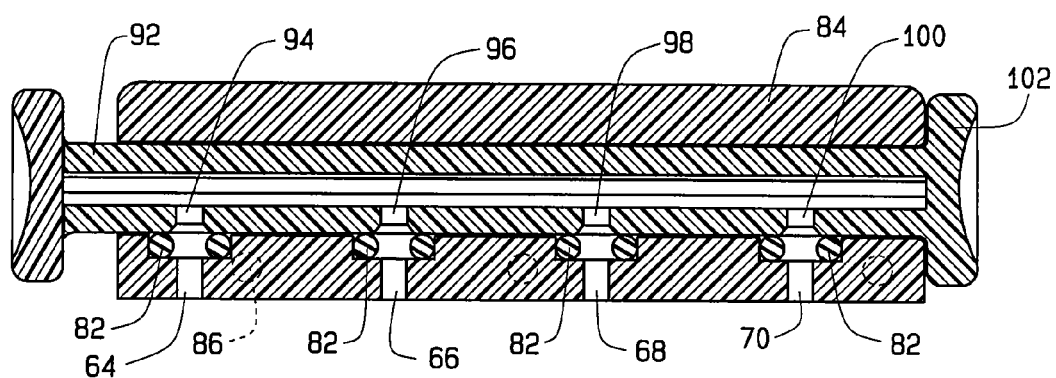
FIG. 7 is a cross sectional view of an assembled valve of FIG. 6 in an open position.
Figure 8:
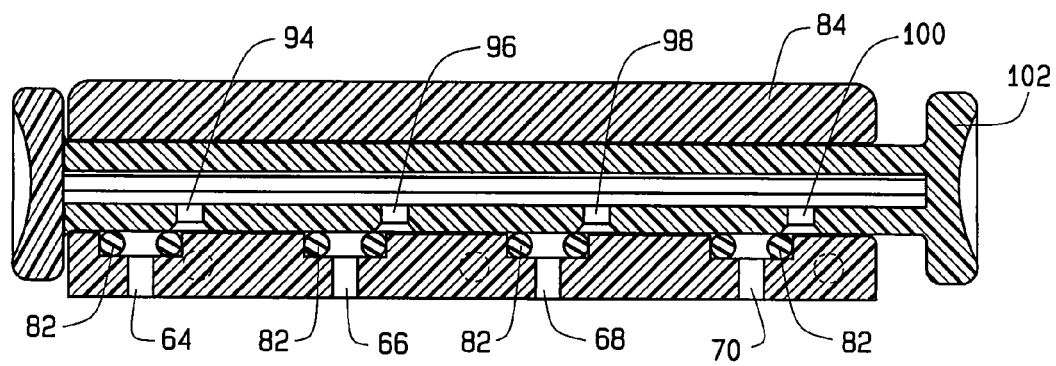
FIG. 8 is cross sectional view of an assembled valve of FIG. 6 in a closed position.

One aspect of a valve of the present invention is indicated by reference number 60 in FIGS. 6 through 8. Valve 60 includes a base section 62 which corresponds to connector assembly 24 in the generally described attachment apparatus shown in FIGS. 1-5. Base section 62 is substantially rectangular in configuration and includes four connector openings 64, 66, 68 and 70 which open into the base from the bores of depending connectors (not seen). The depending connectors and bores are comparable in construction to connectors 26, 28, 30 and 32 described above. Connector openings 64, 66, 68 and 70 are concentric to larger countersunk openings 72, 74, 76 and 78 respectively formed in the top surface of base section 62.

Valve 60 also includes a middle section 80 that has four aligned bores (not seen) with four conduit ends or nipples (not shown) extending into the bores (not shown) of middle section 80 from zones of the inflatable mattress or cushion. The arrangement of the bores and nipples in middle section 80 is similar to that described above in regards to middle section 38. The depending connectors with their connector bores are inserted into the conduit nipples seated in the bores in middle section 80 and secured in a tight friction fit as previously explained. The valve may include a bottom plate similar to bottom plate 52 previously described to secure the assembly in place on the cushion base.

There are four O-ring gaskets 82 seated in the countersunk openings 72, 74, 76 and 78. It will be noted that the O-ring can be referred to as a gasket or a seal or similar verbiage that denotes the function of an O-ring. It also will be noted that the O-ring gaskets fit in the countersunk openings to provide a face seal at the 72, 74, 76 and 78 respectively. The countersunk gaskets work well to seal but do not produce undue friction when the valve is opened and closed as will be explained. A housing 84 is attached to the base section 62 with screws or rivets, for example through holes 86 in the housing and holes 88 in the base section. The housing also can be attached by any appropriate means including gluing or the like. In any event, housing 84 defines an inner 90 bore that has a substantially triangular cross-section. A slide 92 is slidingly engaged in bore 90. Slide 92 is hollow, having an inner bore and has a substantially triangular cross-section as well. The triangular cross-sections of these parts keep the slide from rotating around its longitudinal axis. Slide 92 includes a bottom wall 93 with four aligned holes 94, 96, 98 and 100 through the bottom wall. The valve also can include O-ring gaskets 101 between the side walls of the slide and the housing bore that function like shims to keep the slide 92 centered in inner bore 90 of housing 84. The slide includes flat or concave or shaped knobs 102 at each end for comfortable engagement by the user's fingers. Other devices, such as a handle, can be attached to the slide for comfortable and easy operation by a user.

Each connector bore is in fluid communication with a conduit nipple through middle section 80, and each conduit nipple is in turn in fluid communication with a cushion inflation zone. Slide 92 can be moved laterally within the housing bore so that the holes 94, 96, 98 and 100 in the bottom wall 93 of the slide are in alignment with the connector openings 64, 66, 68 and 70 and the normally isolated inflation zones are then in fluid communication through the slide bore, as shown in FIG. 7. When the openings are moved out of alignment by lateral movement of slide 92, after optimal user positioning on the cushion is achieved, the holes 94, 96, 98 and 100 in bottom wall 93 are out of alignment with the connector openings 64, 66, 68 and 70 (FIG. 8) and hence there is no fluid communication between the individual inflation zones through the slide bore and the zones are isolated.

The triangular design of valve 60 includes advantages over prior art in that the sealing gaskets 82 in countersunk openings 72, 74, 76 and 78 in this configuration provide counterbalanced forces against the O-ring gaskets 101, which allows for easier sliding movement of the slide 92 in the inner bore 90 of housing 84. Also, valve 60 is designed to be tightly attached in a sealed arrangement to the conduits of a cushion via the connector system described above.

Figure 9:
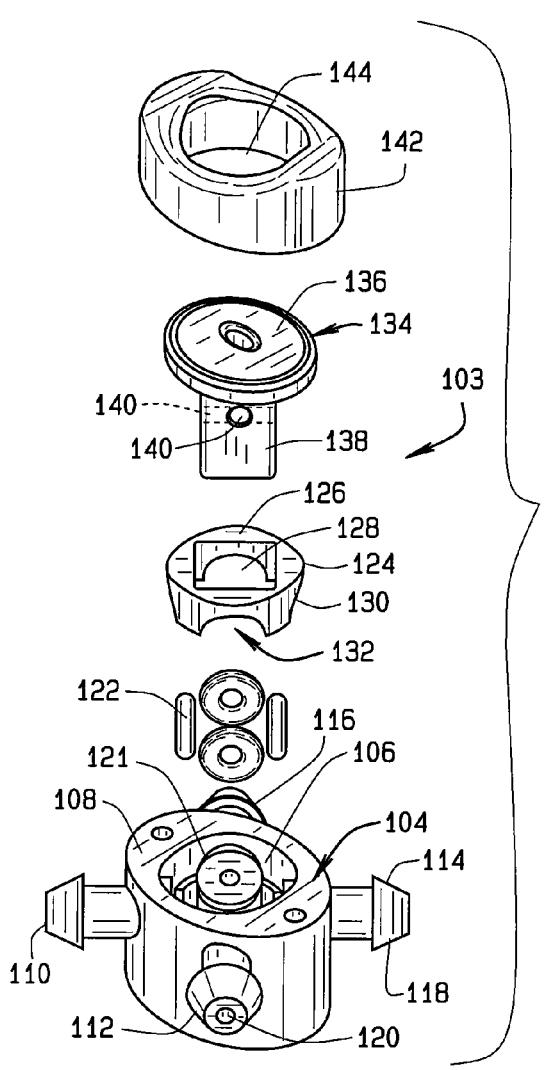
FIG. 9 is an exploded view of one aspect of a valve of the present invention.
Figure 10:
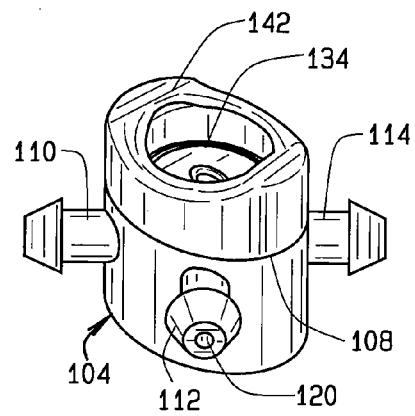
FIG. 10 is a perspective view of an assembled valve of FIG. 9 in an open position.
Figure 11:
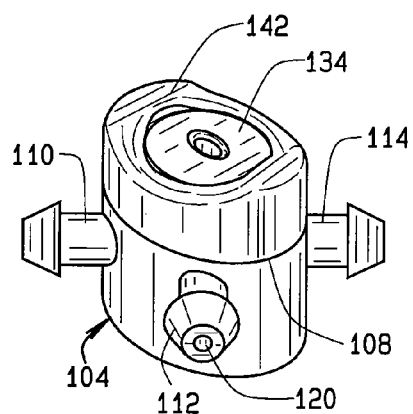
FIG. 11 is a perspective view of an assembled valve of FIG. 9 in a closed position.
Figure 12:
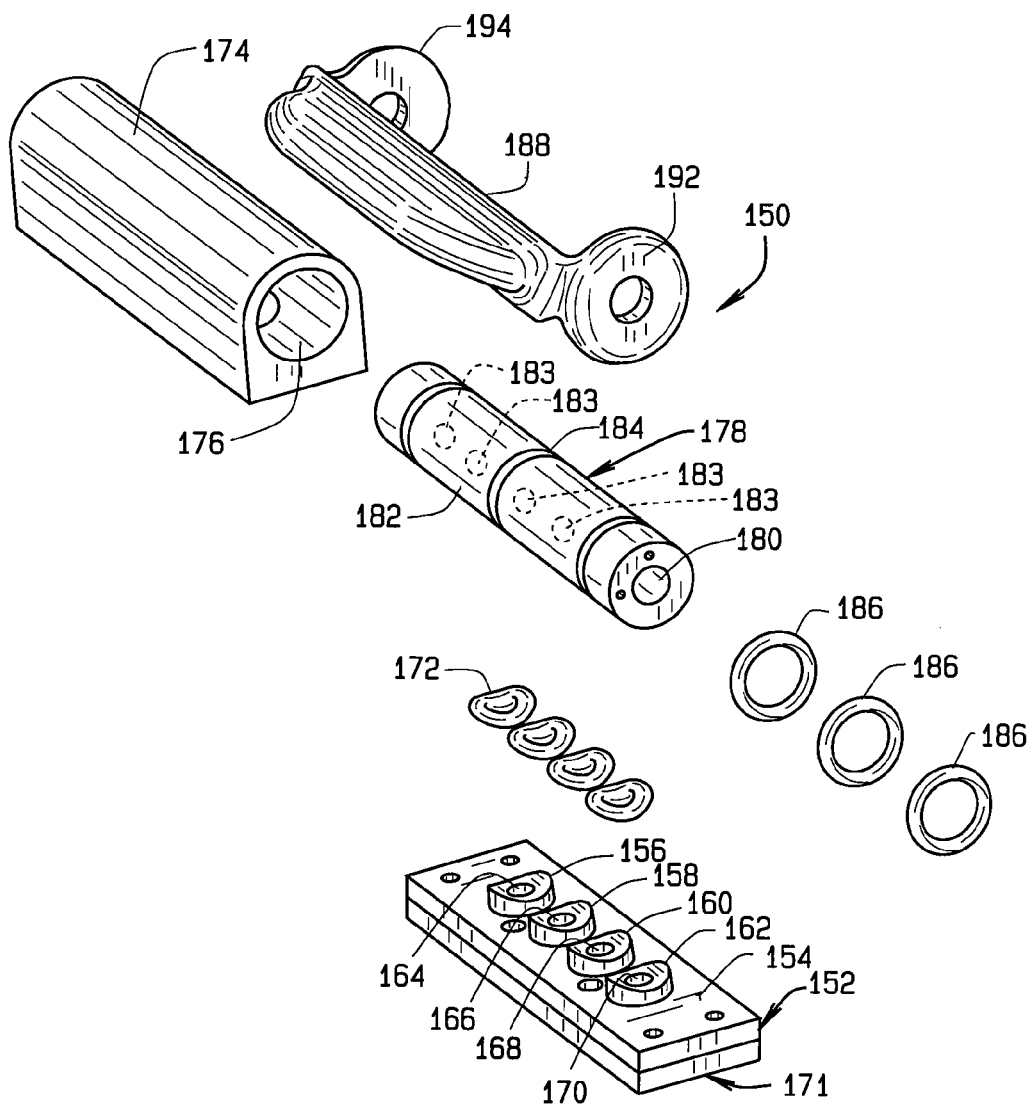
FIG. 12 is an exploded view of one aspect of a valve of the present invention.

FIGS. 9-11 illustrate another embodiment of a valve 103 for a cushion comprising a substantially circular or ovoid body 104 with a center bore 106 defined by a circumferential wall 108. There are four conduit connectors 110, 112, 114 and 116 extending out from the wall, equidistance apart. The connectors each terminate in a beveled tip 118. Each connector defines an internal, longitudinal bore 120 that terminates at a countersunk opening 121 into center bore 106 of body 104. There is an O-ring gasket 122 positioned in each countersunk opening.

It will be appreciated that in certain embodiments of the invention, connectors 110, 112, 114, and 116 could be introduced into open nipple ends of conduits to form a seal described above. That would be particularly true if the connectors bent down at a 90° angle and the nipples were arranged in a rectangular configuration, such as that show in FIG. 19 for example.

There is a slide seat 124 positioned in the top of bore 106. Slide seat 124 includes a top surface 126 having a peripheral configuration such that it fits in bore 106 in a complementary relationship. Top surface 124 includes an opening 128 which in the illustrated embodiment is a square opening or can be a round or oval opening. Slide seat 124 also includes a skirt 130 depending from the top surface. The skirt includes four arch shaped indentions 132 that align with countersunk openings 121 and O-ring gaskets 122. Slide seat 124 is held in place within bore 106 by a tight friction fit or by gluing or other appropriate securing means.

A push-pull slide 134 is slidingly engaged in opening 128 of the slide seat. Push-pull slide has a top disc 136 that is complementary in external configuration to bore 106. A tubular slide 138 depends from disc 136. In the illustrated embodiment, slide 138 has a square cross section that is complementary to opening 128 in the top of the slide seat. It will be understood that slide 138 has openings 140 positioned equidistantly around slide 138. The opens 140 extend horizontally into the slide and are interconnected with in slide 138 in a criss-crossed type pattern. A collar 142 configured to fit over the top of body 104 defines a center opening 144 that allows access to top disc 136 of the push-pull slide and can be secured in place with screws or rivets or glue or any other appropriate means.

It will be understood that connectors 110, 112, 114 and 116 each are connected to one of the previously described cushion air conduits, for example by inserting tip 118 into the open end of a flexible, resilient conduit. When the push-pull slide 134 is pushed down, openings 140 in the walls of the tubular slide 138 are aligned with the countersunk openings and thus in fluid communication with connectors 110, 112, 114 and 116. The associated fluid conduits so that the inflatable zones of the cushion are in communication through interconnected openings 140 of slide 138. When the push-pull slide is pulled up, openings 140 are out of alignment with the connectors, shutting off fluid communication and isolating the individual inflation zones. It will be noted that push-pull slide 134 can be constructed with a top ring, loop, handle, or the like to facilitate the pulling of the push-pull slide into a closed position. To open, a simple thumb pressure on top disc 136 will urge the valve into its open position. Valve 103 can be attached to a cushion at any convenient location so long as the valve has fluid connection to the inflation zones.

FIGS. 12 through 15 illustrate another aspect of the valve and attachment apparatus, indicated generally by reference numeral 150. Valve 150 includes a base 152 that correspondence to the connector assembly 24 of the attachment apparatus previously described. Base 152 is substantially rectangular in configuration comprising a plate 154 and a series of aligned, raised tube seats 156, 158, 160 and 162 having concave top surfaces. The tube seats each include a central opening 164, 166, 168 and 170, respectively. Each of the openings 164, 166, 168 and 170 is in fluid communication with the bore of a depending connector that is similar in construction and function as connectors 26, 28, 30, and 32 in FIGS. 4A and 4B that is inserted into the open end of a nipple of a conduit terminus. The terminus of the conduit is secured in a conduit restraint or nipple frame 171 that is constructed with bores in a manner similar to middle section 38, described above. Consequently, the openings 164, 166, 168 and 170 in the tube seats are each in fluid communication with a cushion inflation zone as previously described. There is an O-ring seal, such as 172, on each tube seat. The seals comprise a material having a low coefficient of friction, such as lubricated material or Teflon or the like, to allow the tube to rotate in the housing as will be set out below.

A housing 174 is position over base 152. Housing 174 includes a central, longitudinal bore 176 having a substantially circular cross section. Housing 174 can be attached to base 152 by any appropriate means such as rivets, screws, gluing or any other appropriate attachment means. There is a tube 178 rotatingly positioned within bore 176. Tube 178 has a substantially circular cross section. Tube 178 has an internal longitudinal bore 180 defined by circumferential wall 182 mates with the concave surfaces of the tube seats. There are a series of four linearly aligned openings or holes 183 through wall 182 into bore 180 and positioned so as to be in registry with openings 164, 166, 168 and 170 when the tube is positioned on the tube seats and the valve is open. There are circumferential grooves 184 around the external surface of wall 182 to seat O-ring seals such as O-rings 186 or gaskets for a tight seal. Further, the O-ring seals are comprised of a material having a low coefficient of friction so as to allow the tube to rotate within the housing bores. The O-rings 186 also function to keep the tube centered in the housing bore.

A handle 188 is attached to tube 178. Handle 188 includes a central gripping central section 190, a first end 192 for connecting to a first end of the tube and a second end 194 for connecting to a second end of the tube. The ends of the handle can be connected to the ends of the tube by any appropriate means, for example, some means that plugs the end of bore 180, which must be closed at the ends in use.

Figure 13:
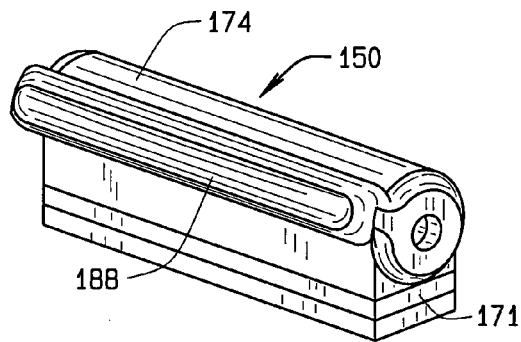
FIG. 13 is a perspective view of an assembled valve of FIG. 12 in an open position.
Figure 14:
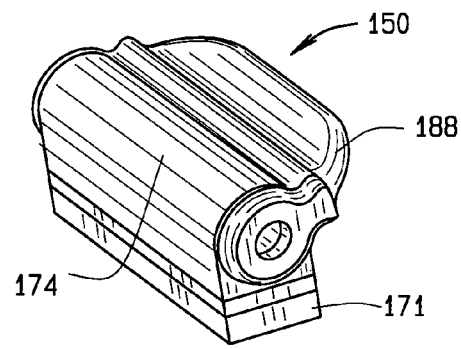
FIG. 14 is a perspective view of an assembled valve of FIG. 12 in a closed position.

As seen in FIGS. 13 and 14, the valve can be opened and closed by using handle 188 to axially rotate tube 178 within the housing. When the holes 183 in the tube wall are in alignment with openings 164, 166, 168 and 170 in the positioned tube seats, the valve is open and the normally isolated cushion inflation zones are in communication through bore 180 of the slide (FIG. 13). When the handle is manipulated and the holes 183 in the tube are out of registry with openings 164, 166, 168 and 170, the valve is closed and the cushion inflation zones are not in fluid communication (FIG. 14).

Figure 15:
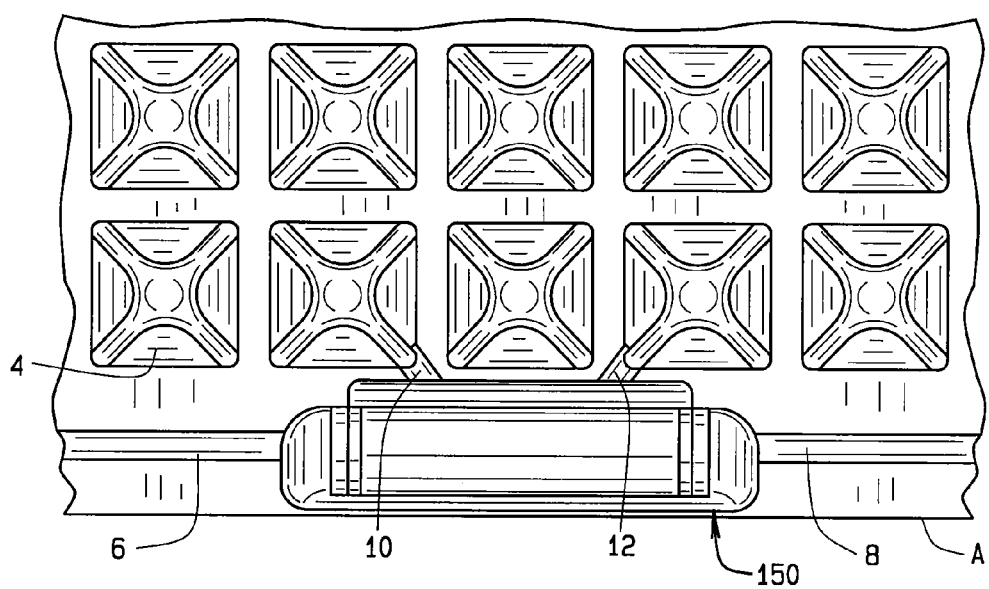
FIG. 15 is a top plan view of the valve of FIGS. 12-14 on an inflatable cushion.

FIG. 15 illustrates valve 150 on an inflatable cellular cushion A. The drawings illustrate how valve 150 is attached to the cushion adjacent the first row of inflatable cells 4. The attachment apparatus described herein facilitates the mounting of valve 150 flush with the front edge of the cushion.

Figure 16:
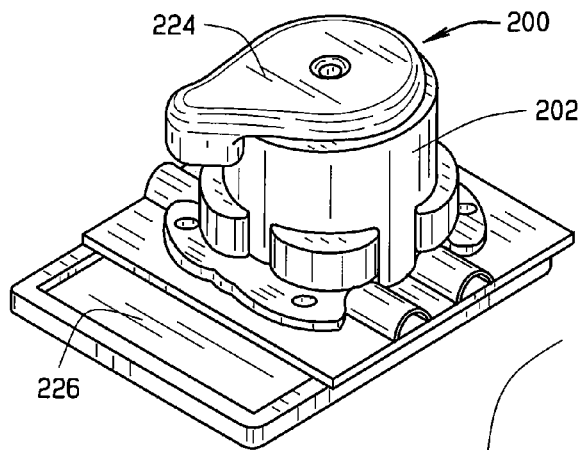
FIG. 16 is a perspective view of one aspect of a valve of the present invention.
Figure 17:
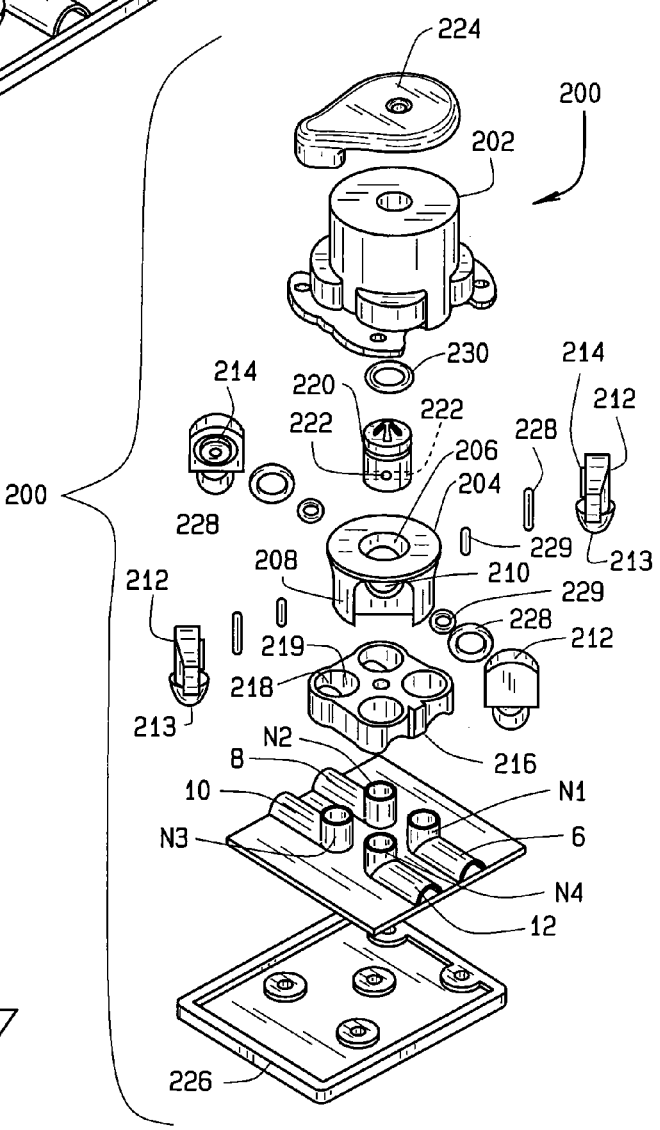
FIG. 17 is an exploded view thereof.

FIGS. 16 and 17 illustrate another aspect of the valve with attachment apparatus of the present invention, indicated generally as reference number 200. Valve 200 with attachment apparatus is attached to cushion air conduits 6, 8, 10, 12 through flexible, resilient, upstanding, open-ended nipples N1-N4, as previously explained. Valve 200 includes a housing 202 that defines an inner cavity (not seen). A bushing 204 is seated in the housing. Bushing 204 includes a central bore 206 and four open arches, as at 208, positioned equidistant around the bushing. Each arch has an opening or hole 210 that is in fluid communication with bore 206. There is a connector 212 configured to seat in each arch. Each connector 212 has a tapered or beveled lower section 213. Each connector has a raised opening 214 and internal bore (not seen) such that when the connector 212 is positioned in an arch 208 the opening 214 and internal bore of the connector is in fluid communication with bore 206 of bushing 204 through holes 210. It will be noted that there are O-ring 228 around the raised connector openings 214 and smaller O-ring 229 between raised opening 214 and shutoff 220. The opposed arrangement of the O-rings 229 in this configuration provide counterbalanced forces against the shutoff 220 to allow the shutoff to turn or rotate with less friction.

It will be understood that connectors 212 and bushing 204 can be separate structures as shown, or may be integral. In any event the connectors or the combination of the connectors and the bushing are analogous to connector assembly 24 previously described.

Valve 200 includes a nipple frame 216 that includes four corner bores 218. Bores 218 include a tapered inner wall 219. Nipple frame 216 is analogous to the middle section 38 described above. The corner bores 218 are dimensioned to fit snugly over the nipples N1-N4. When bushing 204 with connectors 212 is positioned on frame 216 the bottom portions 213 of connectors 212 fit snugly into the nipples positioned within the corner bores 218 such that the nipples are impinged between the bottoms of the connectors 212 and the bore wall 219, as previously described.

A rotating valve shutoff 220 is inserted in bore 206 of bushing 204. Valve shutoff 220 includes four equidistant interconnected openings 222 around its perimeter that are in fluid communication with each other. In other words the openings 222 extend horizontally into shutoff 220 to for a criss-cross configuration of interconnected openings within shutoff 220. Openings 222, sealed with O-rings 229, are arranged so that an opening 222 will be in alignment with raised opening 214, and hence in fluid communication with a connector 212, which in turn is in fluid communication with an inflation zone conduit, when valve 200 is in an open position, thus allowing fluid communication between the zones of the air cell cushion. An actuator 224 is operably attached to the rotating valve shutoff 220 to rotate the shutoff about its vertical axis from an open position wherein the respective openings just describe are in alignment to closed position where the openings are out of alignment and the inflation zones are not in fluid communication through valve shutoff 220.

A bottom plate 226 is positioned under the cushion web so that the housing 202 can be attached to the bottom plate 226 to secure valve 200 in place on the cushion. It will be noted that there is a detent arrangement between the bottom of shutoff 220 and bushing 204 to lock the device in a closed position. In addition, other detent arrangements of any suitable type can be used between a rotating and stationary parts to lock the device in a closed position.

In any event, as described valve 200 functions similarly to previously described valves to place the normally isolated inflation zones in fluid communication through the valve and then to close off that communication by rotating valve shutoff 220.

It will be appreciated that O-ring 228 can be employed as needed or desired between the various elements to provide tight seals and prevent air leakage. In the disclosed embodiment, O-ring 230 is positioned between the housing 202 and shutoff 220 to provide a seal against leakage through the housing. The seal can be adjusted by the size and material of O-ring 230.

Figure 18:
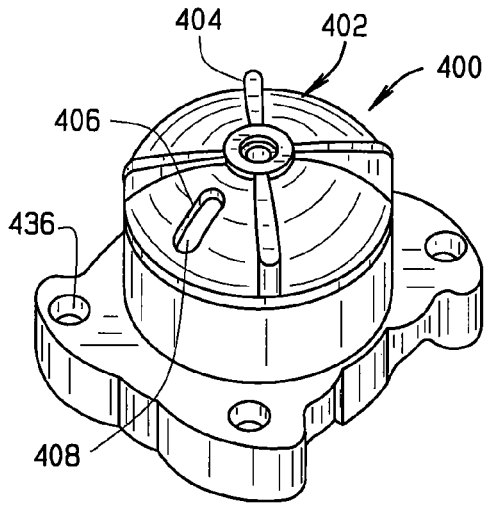
FIG. 18 is a perspective view of another aspect of a valve of the present invention.

FIGS. 18 and 19 illustrate another aspect of the valve and attachment apparatus indicated by reference number 400. Valve 400 can have an internal and function similar to valve 200. In any event, instead of an actuator constructed like actuator 224, for example, valve 400 includes a knob 402 that has raised finger gripes 404. Knob 400 also includes a slot 406 that allows viewing of the top surface of the underlying housing 408. The top surface of the housing can include a color area A, such as the color red or the like, which can be viewed through slot 406 when knob 402 is rotated so the valve is in a closed position. The closed indicator color would be located on the top of the housing only at a position that can be viewed when the valve is closed. The other surface of the house can be a distinctly different color, such as green or gray so that that the user can immediately see through slot 406 whether valve 400 is open or closed.

In any event, valve 400 is attached to cushion conduits through nipples N!-N4 as previously explained. Valve 400 includes housing 408 that defines an inner cavity and a top opening or hole 409. A bushing 410 is seated in the housing.

Bushing 410 includes a central bore 411 and four arches 412 spaced equidistant around the bushing. Each arch has an opening or hole 414 that is in fluid communication with bore 411. (See pages 25 & 26)

There is a connector 415 configured to fit in each arch. Each connector 415 has a beveled or tapered lower section 416 and an raised opening 418 and internal bore (not seen) such that when connector 415 is positioned in an arch 412 the opening 418 is in fluid communication with bore 411 of bushing 410. The bushing and connectors may be separate elements as shown, or may be integral. In any event, the connectors or combination of connectors and bushing 410 are analogous to the connector assembly 24 and connectors 26, 28, 30 and 32, described above.

Valve 400 includes a nipple frame 420 that includes four corner bores 422 that have tapered inner walls 423. The nipple frame is analogous to middle section 38 described above. Bores 422 are dimensioned to fit snugly over nipples N1-N4. When bushing 410 with connectors 415 is assembled with frame 420, the lower sections 416 of the connectors 415 fit snugly into the nipples positioned with the corner bores such that the nipples are impinged between the lower sections 416 of the connectors and the inner wall 423 of bores 422 to secure the assembly in place and form a tight seal.

A rotating shutoff 424 is inserted in bore 411 of bushing 410. Shutoff 424 has an upper segment 424A with teeth that can extend through opening 409 in the housing and engage grooves (not seen) in the inside of actuator 402. There is an O-ring 426 positioned between the housing and shutoff 424 to provide a seal against leakage through the housing. The seal can be adjusted by changing the size or material of O-ring 426. A screw 425 or other securing means engages the actuator 402 and extends through hole 409 in housing 408 to engage a threaded opening in the upper segment 424A of shutoff 424. When actuator 402 is rotated, shutoff 424 will rotate about its vertical axis, as will be explained.

Shutoff 424 includes four equidistant interconnected openings 428 around its perimeter that are in fluid communication with each other in a criss-crossed pattern of interconnected openings within shutoff 424. Openings 428 are arranged so that an opening 428 will align with a raised opening 418 in a connector 415 when valve 400 is in an open position thus allowing fluid communication between the zones of the air cell cushion through interconnected openings 428 in the rotating shutoff. Hence, when actuator 402 is rotated to place the recited openings in alignment, valve 400 is open. When actuator 402 is rotated to take the respective openings out of alignment, valve 400 is closed. The opposed arrangement of the O-rings 413 in this configuration provide counterbalanced forces against the shutoff 424 to allow the shutoff to turn or rotate with less friction.

The user can visually see when the valve is closed by viewing area A, for example, through opening 406 in actuator 402. It will be appreciated that there can be a detent arrangement of any appropriate type between the shutoff 424 and bushing 410 to secure the valve in a closed position.

A bottom plate 430 is positioned under the cushion base so that housing 408 can be attached to the bottom plate 430 to secure valve 400 in place on the cushion. This can be accomplished by the use of screws 432 as shown, or rivets (not shown), that can extend through openings 434 of bottom plate 430 and engage openings 436 in the perimeter of housing 408.

Figure 20:
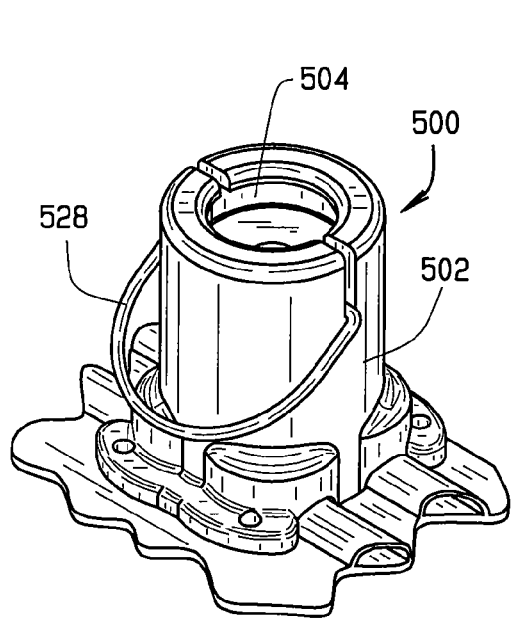
FIG. 20 is a perspective view of a valve of the present invention.
Figure 21:
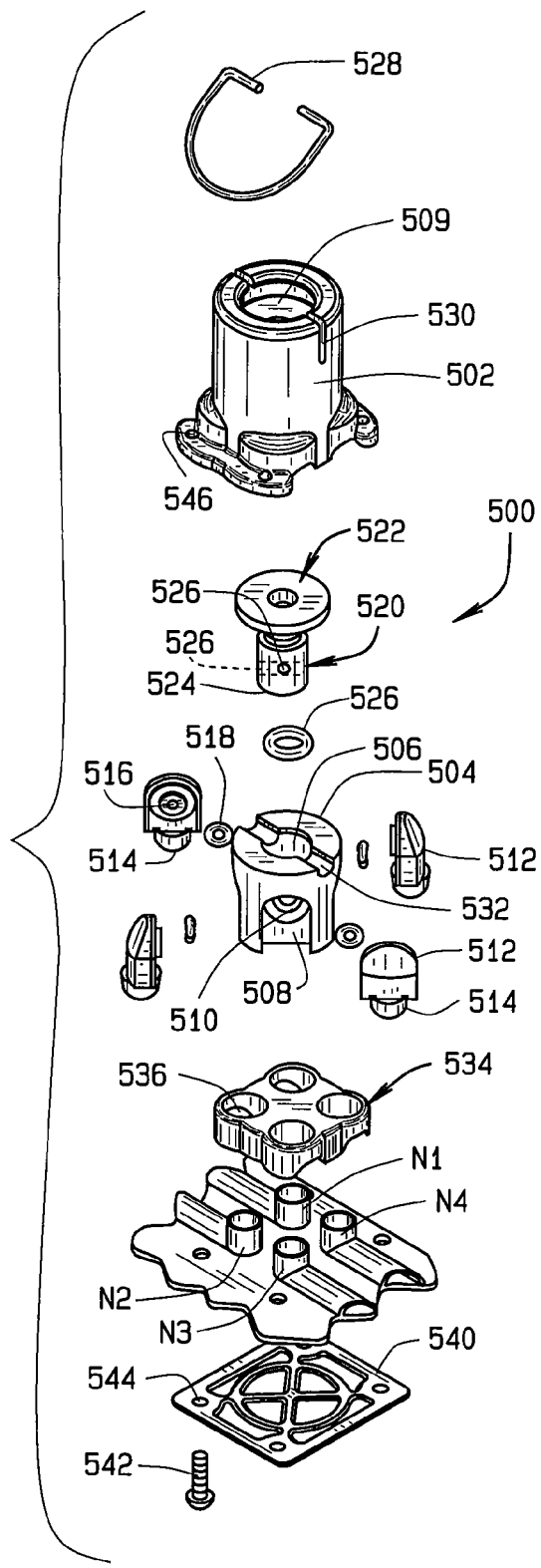
FIG. 21 is an exploded view thereof.

FIGS. 20 and 21 illustrate another aspect of the valve and attachment apparatus of the present invention, indicated generally by reference number 500.

Valve 500 includes a housing 502 with an inner bore 509. Valve 500 is attached to cushion conduits through nipples N1-N4 as previously explained. Valve 500 includes a bushing 504 seated in the housing bore 509. Bushing 504 includes a central bore 506 and four arches 508 spaced equidistant around the bushing. Each arch has an opening or hole 510 that is in fluid communication with bore 506. There is a connector 512 configured to fit in each arch or can be integral with the bushing. Each connector 512 may have a tapered or beveled lower section 514 and an raised opening 516 and internal bore (not seen) such that when connector 512 is positioned in an arch 508 the opening 516 is in fluid communication with bore 506 of bushing 504 through opening 510. There are O-rings 518 between the connector raised openings 516 and the push-pull slide 520 to seal the arrangement. The connectors or combination of connectors and bushing 504 are connected to conduits, as will be described below, and are analogous to the top section 24 and connectors 26, 28, 30 and 32, described above. Furthermore, bushing 504 and the connectors can be separate, as shown, or an integral element.

Valve 500 includes a push-pull slide 520 having a disc shaped top section 522 and a concentric, tubular lower section 524 that includes four equidistant interconnected openings 526 around its perimeter that are in fluid communication with each other. Disc shaped top section is configured and sized to fit snugly within bore 509 of the housing. Although the embodiment shows the components as round or cylindrical, any configuration of housing, slide, and so forth, such as rectangular or the like, falls within the scope of the invention.

Push-pull slide 520 is seated in bore 506 of the bushing and sealed with an O-ring 518. Push-pull slide 520 can be moved up and down within bore 506 in a push-pull arrangement so that holes 526 generally are in alignment and fluid communication with holes 516 in the connectors to open the valve and allow fluid communication between the zones of a cushion through the push-pull slide holes 526, and out of alignment and fluid communication with the recited holes to close the valve. The opposed arrangement of the O-rings 518 in this configuration provide counterbalanced forces against the shutoff 520 to allow the shutoff to turn or rotate with less friction.

To facilitate pulling the push-pull slide up, a D-ring 528 is attached to the push-pull slide in any appropriate manner and can rotate from an upright to a down or resting position as shown in FIG. 20. The D-ring can rest in grooves 530 in the housing when depressed. Slots 532 in the top of the bushing allow the D-ring to rotate in the top of the bushing from an erect position to a down position. The D-ring is just one representative embodiment of a grasping apparatus that can be attached to the slide. Any apparatus that allows better grasping or gripping of the slide is within the scope of the invention.

Valve 500 includes a nipple frame 534 that includes four corner bores 536 that can have tapered inner walls The nipple frame is analogous to middle section 38 described above. Bores 536 are dimensioned to fit snugly over nipples N1-N4. When bushing 504 with connectors 512 is assembled with frame 534, the lower sections 514 of the connectors 512 fit snugly into the nipples positioned with the corner bores such that the nipples are impinged between the lower sections 514 of the connectors and the inner wall of bores 536 to secure the assembly in place and form a tight seal.

A bottom plate 540 is positioned under the cushion base so that housing 502 can be attached to the bottom plate 540 to secure valve 500 in place on the cushion. This can be accomplished by the use of screws 542 as shown, or rivets (not shown), that can extend through openings 544 of bottom plate 540 and engage openings 546 in the perimeter of housing 502 or by any other appropriate attachment apparatus or means.

It will be noted from the foregoing that the term "connector assembly" is intended to include any structures or combination of structures or elements that connect the conduits leading from individual inflation zones to a valve apparatus in a tight, sealing arrangement described herein. Moreover, although the foregoing implies that the attachment apparatus and associated valve is generally located at an edge of the cushion, the invention is not limited to that design. For example, valves 100, 200, 400 and 500 attach to a rectangular pattern of conduits. These or similar valves could be located within the array of cells. For example four conduit nipples in a rectangular arrangement could be located in place of any one of the cells and an appropriate valve attached thereto using the attachment apparatus and valve of the present design.

The disclosed apparatus for attachment of a valve to a zoned cellular cushion provides an advantageous connection that prevents air leakage and is more difficult to dislodge or the like. The disclosed valve designs are easier to operate by a person having limited hand function. The valves operate with less force than prior art valves.

It will be appreciated by those skilled in the art that the valves and attachment apparatus described and shown in the drawings are representative of the broader aspects of the invention and therefore, the specification and drawings should not be considered limiting on the scope of the invention.

The invention claimed is:

1. In an inflatable mattress or cushion having a base and an array of upstanding fluid filled cells on one side of the base, said array of cells being divided into a plurality of inflation zones, each zone having a fluid conduit with one end in fluid communication with the zone and a second end, a valve used to place the plurality of inflation zones in or out of fluid communication with each other, the valve comprising:
   a housing defining an inner bore;
   a valve shutoff rotatingly engaged within the housing bore, said rotating valve shutoff having a wall with a plurality of openings through the wall and interconnected within the shutoff;
   a plurality of connectors, each having an inner bore, an open first end and an open second end;
   a conduit constraint having a plurality of openings therein, each opening configured to secure the second end of a conduit, said open second end of each of said connectors being engaged in a second end of the conduit secured in the conduit constraint, said connector impinging said second end of the conduit between itself and the opening in the conduit constraint so as to form a tight seal and to secure the connector within the second end of the conduit;
   an actuator at the top of the housing and secured to said valve shutoff to effect axial rotation of the valve shutoff within the valve housing whereby axial rotation of said valve shutoff to a first position places said interconnected openings in the shutoff in fluid communication with the open first ends of the connectors thereby opening the valve to allow air flow between the inflation zones through the interconnected shutoff openings in the shutoff and axial rotation to a second position takes said openings in the valve shutoff out of fluid communication with the open first ends of the connectors thereby closing the valve.

2. The valve of claim 1 further comprising a bottom plate positioned below the base of the mattress or cushion and secured to the valve housing to secure the valve to the mattress or cushion.

3. The valve of claim 1 wherein the actuator is a knob, said knob having an opening therein whereby a user can visually determine through the opening that the valve is in a closed position.

4. The valve of claim 1 wherein said plurality of connectors further comprise an connector assembly, said connector assembly further comprising a bushing within said housing, said bushing having a bore therein for positioning of the valve shutoff, said bushing further including a plurality of bushing seats for the open first ends of the connectors, each said bushing seat having an opening therein in fluid communication with an open first end of a connector and in fluid communication with the interconnected openings in the valve shutoff when the valve shutoff is rotated to an open position thereby allowing fluid communication between the zones through the interconnected shutoff openings and rotation of the valve shutoff to a closed position takes the openings in the valve shutoff out of communication with the open first end of the connector out of fluid communication.

5. The valve of claim 4 wherein said connectors are integrally formed with said bushing.

6. The valve of claim 4 wherein the bushing seats for the open first ends of the connectors are spaced equidistantly around the bushing in an opposed relationship and include a gasket between open first ends of the connectors and the openings in the bushing seats whereby said connectors apply opposing forces to the gaskets between the open first ends of the connectors and the openings in the bushing seats.

7. The valve of claim 4 wherein the connector assembly comprises four connectors and said conduit constraint comprises four openings.

8. In an inflatable mattress or cushion having a base and an array of upstanding fluid filled cells on one side of the base, said array of cells being divided into a plurality of inflation zones, each zone having a fluid conduit with a first end in fluid communication with the zone and a second end, a valve used to place the plurality of inflation zones in or out of fluid communication with each other, the valve comprising:
   a housing defining an inner bore;
   a slide engaged within the housing bore and moveable along a vertical path within the housing bore, said slide having a wall with a plurality of openings therethrough, said openings interconnected within the slide;
   a connector assembly comprising a plurality of connectors, each having an inner bore, an open first end in fluid communication with one of said plurality of holes in the slide and an open second end;
   a conduit constraint having a plurality of openings therein, each opening configured to secure the second end of a conduit, an open second end of a connector positioned in the second end of each conduit secured in the conduit constraint, said connector impinging said second end of the conduit between itself and the opening in the conduit constraint so as to form a tight seal and to secure the connector within the second end of the conduit;
   whereby vertical movement of the slide in one direction within the valve housing causes said openings in the in the slide to be in fluid communication with the open first ends of the connectors thereby opening air flow between the inflation zones through the interconnected slide openings and vertical movement in an opposite direction causes said openings in the slide to be out of fluid communication with the open first ends of the connectors thereby closing the valve.

9. The valve of claim 8 wherein said connector assembly further comprises a bushing seated within said housing, said bushing having a bore therein for positioning of the slide, said bushing further including a plurality of connector seats for the open first ends of the connectors, each said connector seat having an opening therein in fluid communication with an open first end of a connector and in fluid communication with the openings in the slide when the slide is moved vertically to an open position thereby allowing fluid communication between the zones through the openings in the slide and vertical movement of the slide to a closed position takes the openings in the slide out of communication with the open first end of the connector thereby blocking fluid communication between the zones.

10. The valve of claim 8 further comprising a base positioned under the mattress or cushion base, said base connected to said housing to further secure the valve to the mattress or cushion.

11. The valve of claim 8 wherein said slide further comprises a grasping apparatus for grasping by the use when pulling the slide up.

\* \* \* \* \*